United States Patent
Beyer et al.

(10) Patent No.: US 6,390,373 B1
(45) Date of Patent: May 21, 2002

(54) CHIP CARD

(76) Inventors: Wolfgang Beyer, deceased, late of Höchstadt (DE); by Michael W. A. Beyer, heir, Victor-von-Scheffel-Strasse 13, Höchstadt (DE), D-91315; Klaus Nolte, Lohmülweg 7, Röttenbach (DE), D-91341; Heinz Karl Peppler, Frankenberg 51A, Kitzingen (DE), D-97302

( * ) Notice: Subject to any disclaimer, the term of this patent is extended or adjusted under 35 U.S.C. 154(b) by 0 days.

(21) Appl. No.: 09/091,091

(22) PCT Filed: Dec. 7, 1996

(86) PCT No.: PCT/EP96/05487

§ 371 (c)(1),
(2), (4) Date: Aug. 9, 1999

(87) PCT Pub. No.: WO97/22084

PCT Pub. Date: Jun. 19, 1997

(30) Foreign Application Priority Data

| Dec. 11, 1995 | (DE) | 195 46 189 |
| Mar. 18, 1996 | (DE) | 196 10 505 |
| Apr. 17, 1996 | (DE) | 196 15 142 |
| May 30, 1996 | (DE) | 196 21 597 |

(51) Int. Cl.$^7$ ............................................. G06K 19/06
(52) U.S. Cl. ........................................ 235/492; 235/487
(58) Field of Search ................................. 235/492, 487

(56) References Cited

U.S. PATENT DOCUMENTS 6,042,009 A * 3/2000 Barrett et al. ................ 235/441
6,068,183 A * 5/2000 Freeman et al. ............. 235/375

* cited by examiner

Primary Examiner—Michael G. Lee
Assistant Examiner—Allyson Sanders
(74) Attorney, Agent, or Firm—Collard & Roe, P.C.

(57) ABSTRACT

A chip card comprising a memory chip and/or processor chip is characterized by the presence of a mirror memory to which any new internal stored data are transferred by an external read or write device whenever the memory chip and/or processor chip carry out an operation. The mirror memory thus has stored data corresponding to the stored contents in the memory chip and/or processor chip, and an LCD display or similar device with a voltage supply from at least one solar cell or the like. The mirror memory is lined to the LCD display or similar device with a voltage supply from at least one solar cell or the like. The mirror memory is linked to the LCD display in such a way that the data stored in said memory can be displayed by the LCD display.

8 Claims, 1 Drawing Sheet

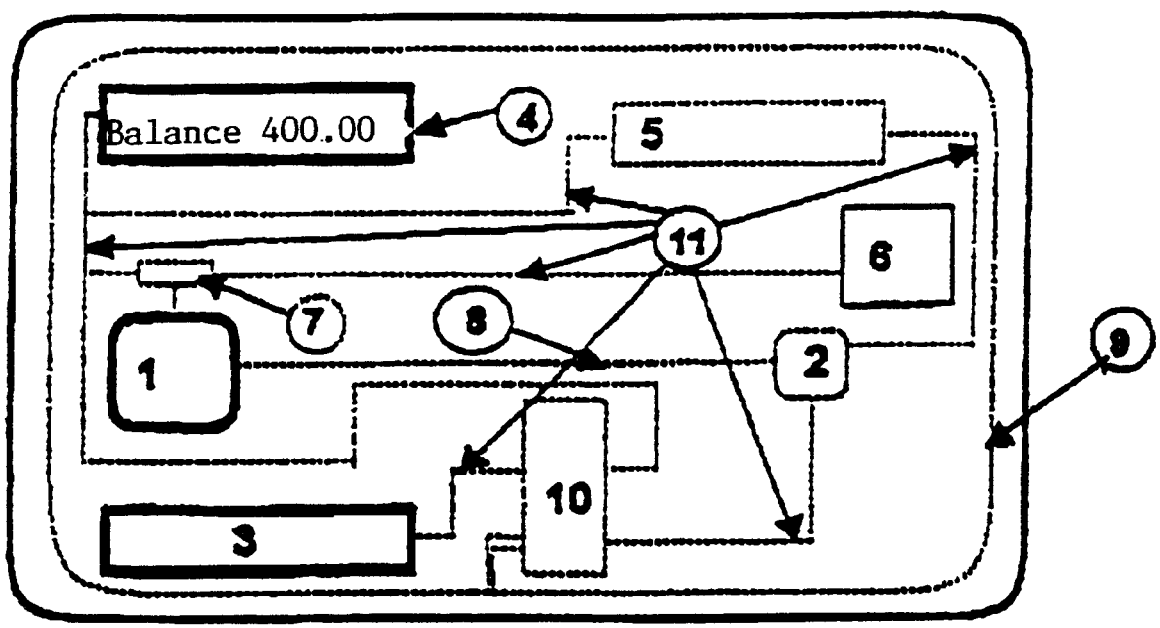

CHIP CARD

The invention concerns a chip card comprising a memory chip and/or processor chip.

Chip cards of this type find increasing acceptance for cashless payment transactions since beyond pure recognition and storage such as for instance with the aid of a magnetic strip they permit interactive communication with an external reading or writing device. As a consequence information can be read from the chip card, new information can be written into the chip card and information can be interactively processed with the chip card for instance in order to generate an identification similar to a signature or a key providing access authorization.

The communication between card and reading or writing device can either be effected by providing the card with a contact field which is brought in contact with corresponding contacts in the reading/writing device or contactless, for instance through inductive or capacitive information transfer.

A major disadvantage of known chip cards which also significantly limits their application is that the information content of the cards can only be read out in connection with a reading/writing device. In other words it is generally necessary that the card holder introduces his card in such a device or communicates with such in a contactless manner in order to be able to read on the device the information stored on the card.

Based on this the task of the invention is to design a chip card of the type under consideration in such a way that its application can be significantly expanded so that reading of the card contents or the current operating mode of the card is easily possible at any time without the help of external reading devices.

This task according to the invention is solved by a mirror memory onto which the internal new memory information is transferred with each operation of the memory chip and/or processor chip in connection with an external reading or writing device so that the mirror memory shows memory information according to the memory contents in the memory chip and/or processor chip and an LCD or similar with a power supply from at least one solar cell or similar while the mirror memory is connected with the LCD in such a way that the information stored therein can be displayed by means of the LCD.

The combination of an LCD for the memory content with a solar cell makes it possible, independent of battery power, to read the memory contents with the help of solar light or artificial light which is required in any case to look at the card. The mirror memory is formed by a so-called balcony chip or Easik memory with sequence logic.

With this, according to the invention, the data information can be read from the mirror memory without having to activate the memory and/or processor chips. As a consequence little energy is required for reading so that the power currently available through the solar cell is sufficient.

The display possibility provided by the invention makes it possible for instance to design the chip card as a public transport ticket or ticket of admission while an inspector would be able at any time to check if the appropriate debit transaction has been carried out beforehand. Insofar as the card is used for general payment transactions it is possible in the manner according to the invention for instance to read out the balance of an account. In principle it is therefore possible to subsequently check the status of the card at any time after the latest communication process with a writing/reading device without such so that especially third parties not involved in this communication process are also able to obtain information on such.

A further embodiment of the invention is a switching device connected with a memory chip and/or processor chip, especially resistance switching device for changing over the chip card operating mode and/or the memory contents to enable a scroll-type display changeover.

The switching device is preferably designed as a resistance switch in such a way that the switch can be actuated for instance by exerting thumb pressure on a certain card area similar to a push-button switch, while the switching impulses thus generated are electronically utilised to achieve an advance pulse. In this way it is possible to consecutively activate various memory areas and call up their contents or to run various processor chip activities. As a consequence the card can be used multi-functionally and be suitably switched over as required. In connection with the optical reading of the memory contents which is possible at any time the user can control the changeover by actuating the changeover, i.e. he immediately recognizes from the display the current operating mode of the card and the memory areas which are activated. With this scrolling or changeover operating mode it proves of particular advantage to use a mirror memory for instance in form of an Easik memory, since its low current requirement allows a low consumption of energy for the display.

In order to permit a contactleas exchange of information with a reading/writing device an antenna coil can be arranged on the card which is connected with the memory chip and/or processor chip. The coil can for instance be formed on the card as a printed circuit or run around the card so that in all cases it is ensured that the flat card geometry remains largely unchanged.

If it is desired to be independent from the respective lighting intensity when reading out or in operation, a storage medium for instance in form of a battery or a capacitor can be assigned to the solar cell so that the energy in the unutilized state can be collected and stored over an extended period of time and be called off in concentrated form during utilization.

A further advantageous embodiment provides for the chip card to incorporate an identification field which permits the reading in of significant personal data such as for instance a fingerprint for comparison with corresponding identification data previously stored in the memory chip. In this way it can be ensured that the card can factually only be used by the authorised user whereas the loss of the card does not enable an unauthorised finder to activate the card.

A favorable provision is that at least one contactless memory chip or processor chip and at least one contact-type memory chip or processor chip are arranged on the card which are interconnected in such a way that they hold at least partially the same information contents. As a consequence it is possible to communicate optionally with contact or contactless with a reading/writing device.

The invention also concerns a method for the manufacture of such a chip card wherein it is intended that the individual components are first arranged on a carrier foil, preferably made of ABS, and then provided with a plastic cladding excluding possible contact areas.

The cladding is preferably achieved by spraying or application of sleeve foils.

In the following the invention is explained in more detail making use of a preferred embodiment example with the help of the drawing. The drawing is a schematic top view of a chip card according to the invention.

According to the drawing a contact-type chip 1 with corresponding contact field, a contactless chip 2, and a solar cell 3 and an optical display in form of an LCD 4 are arranged on the chip card.

A battery 5 serves as buffer or intermediate storage for the entering light energy which is converted by the solar cell 3.

A pressure contact switch 6 serves as changeover switch between various operating modes or memories.

A mirror memory 7 or a so-called balcony chip is assigned to the contact-type chip 1 which permits reading out of the memory information from chip 1 available in mirror image in the chip 7 without having to activate the processor chip 1 itself, i.e. the reading out can be accomplished with the use of the energy supplied by the solar cell 3.

The contact-type chip 1 and the contactless chip 2 are interconnected by means of a data exchange line 8 so that it is possible for both chips to hold at least partly the same information contents.

A coil 9 for sending and receiving upon communication with a reading/writing device is assigned to the contactless chip 2.

A capacitor control module 10 makes it possible to store electric energy in the capacitor in this way covering possible peak energy demand.

The electrical connection of the individual components in its entirety is marked with 11.

Numerous modifications beyond the embodiment example described above are conceivable:

For example the solar cell can supply energy for computing operations of the chip or chips.

Beside the mentioned power storage for covering the peak demand the capacitor control module can also store excess energy in the contactless area or excess energy from a reading/writing device or unused energy.

In a further embodiment an optical data transfer between chip and display for instance in form of a vacuum fluorescence display is conceivable. A crystal memory can be provided in the optical display as buffer store.

In addition the optical display can be designed statically, i.e. the memory information displayed there remains visible in position over extended periods of time without further power supply.

What is claimed is:

1. A chip card comprising a memory chip and/or processor chip characterised in that a mirror memory (7) onto which the internal new memory information is transferred with every operation of the memory chip and/or processor chip (1, 2) in connection with an external reading or writing device so that the mirror memory (7) holds memory information according to the memory contents in the memory chip and/or processor chip (1, 2) and an LCD (4) or such like with a power supply from at least one solar cell (3) or such like, wherein the mirror memory (7) is connected with the LCD (4) in such a way that the information stored therein can be displayed with the LCD (4).

2. The chip card especially according to claim 1, characterised by a switching device connected with a memory chip and/or processor chip (1, 2), especially a resistance switching device for changing over the chip card operating mode and/or the memory contents to permit a scroll-type changeover display.

3. The chip card according to claim 1, characterised in that an antenna coil (9) preferably accomplished through printing on, is arranged on the card.

4. The chip card according to claim 1, characterised in that a storage medium, preferably in form of a battery (5) and/or a capacitor is assigned to the solar cell (3).

5. The chip card according to claim 1, characterised in that it has an identification field which permits the reading in of significant personal data such as a fingerprint for comparison with corresponding identification data previously stored in the memory chip.

6. The chip card according to claim 1, characterised in that at least one contactless memory chip or processor chip (1) and at least one contact-type memory chip or processor chip (2) are provided which are interconnected in such a way that they hold at least partly the same information contents.

7. The process for the manufacture of a chip card according to claim 1, characterised in that the individual components are initially arranged on a carrier foil, preferably made of ABS, and then provided with a plastic cladding excluding any possible contact areas.

8. The process according to claim 7 characterised in that the cladding is realised through spraying or application of a sleeve foil.

\* \* \* \* \*